(12) United States Patent
Kim et al.

(10) Patent No.: US 12,111,118 B2
(45) Date of Patent: Oct. 8, 2024

(54) HEAT EXCHANGER AND HEAT EXCHANGER MANUFACTURING METHOD

(71) Applicant: LG ELECTRONICS INC., Seoul (KR)

(72) Inventors: Sungwoo Kim, Seoul (KR); Seungmo Jung, Seoul (KR); Hongseong Kim, Seoul (KR); Hanchoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 204 days.

(21) Appl. No.: 17/501,116

(22) Filed: Oct. 14, 2021

(65) Prior Publication Data

US 2022/0120503 A1 Apr. 21, 2022

(30) Foreign Application Priority Data

Oct. 16, 2020 (KR) .................. 10-2020-0134404

(51) Int. Cl.
 *F28D 7/16* (2006.01)
 *B23P 15/26* (2006.01)
 *F28F 9/02* (2006.01)

(52) U.S. Cl.
 CPC ............... *F28D 7/16* (2013.01); *B23P 15/26* (2013.01); *F28F 9/02* (2013.01)

(58) Field of Classification Search
 CPC ............ F28D 7/16; F28F 9/02; B23P 15/26
 (Continued)

(56) References Cited

U.S. PATENT DOCUMENTS 1,950,500 A * 3/1934 Loprich .................. F28F 1/18
 165/DIG. 380
4,657,072 A * 4/1987 Mulock-Bentley ..... F28F 1/126
 165/122
(Continued)

FOREIGN PATENT DOCUMENTS

EP 3 598 052 1/2020
KR 10-0644135 11/2006
(Continued)

OTHER PUBLICATIONS

European Search Report dated Feb. 25, 2022 issued in EP Application No. 21202822.9.

*Primary Examiner* — Raheena R Malik
(74) *Attorney, Agent, or Firm* — KED & ASSOCIATES

(57) ABSTRACT

A heat exchanger is provided that includes a tube panel module elongated in a vertical direction and including a plurality of first tube panels and a plurality of second tube panels that are alternately arranged in a lateral direction; header panel modules respectively formed at an upper end and a lower end of the tube panel module and elongated in the lateral direction; and a header case having an open one side, providing a space therein, and covered on the one side by the header panel module such that the plurality of first tube panels and the plurality of second tube panels communicate with the space. Each first tube panel is formed by bonding a first panel and a second panel, and each second tube panel is formed by bonding a third panel and a fourth panel. The header panel modules include a first header panel formed by bending both ends of the first panel and the second panel in opposite directions, and a second header panel formed by bending both ends of the third panel and the (Continued)

fourth panel in opposite directions and bonded to the first header panel between every first tube panel and second tube panel.

11 Claims, 11 Drawing Sheets

(58) Field of Classification Search
　　　USPC .......................................................... 165/175
　　　See application file for complete search history.

(56) References Cited

U.S. PATENT DOCUMENTS

| | | | |
|---|---|---|---|
| 4,974,670 A * | 12/1990 | Noguchi | F25B 39/024 |
| | | | 165/DIG. 466 |
| 9,982,948 B2 * | 5/2018 | Lee | F28F 1/32 |
| 2013/0146247 A1 * | 6/2013 | Kim | F28D 1/0316 |
| | | | 165/41 |
| 2013/0146255 A1 * | 6/2013 | Kim | F28D 15/0233 |
| | | | 165/104.13 |
| 2013/0146264 A1 * | 6/2013 | Kim | F28D 7/0041 |
| | | | 165/181 |
| 2020/0011607 A1 | 1/2020 | Kusaka et al. | |
| 2022/0120503 A1 * | 4/2022 | Kim | B23P 15/26 |
| 2022/0214113 A1 * | 7/2022 | Zhang | F28F 1/025 |

FOREIGN PATENT DOCUMENTS

| | | |
|---|---|---|
| KR | 20-0432601 | 12/2006 |
| KR | 20-2007-0017024 | 4/2009 |
| KR | 10-1447072 | 10/2014 |
| KR | 10-2019-0097632 | 8/2019 |

* cited by examiner

[FIG. 1]
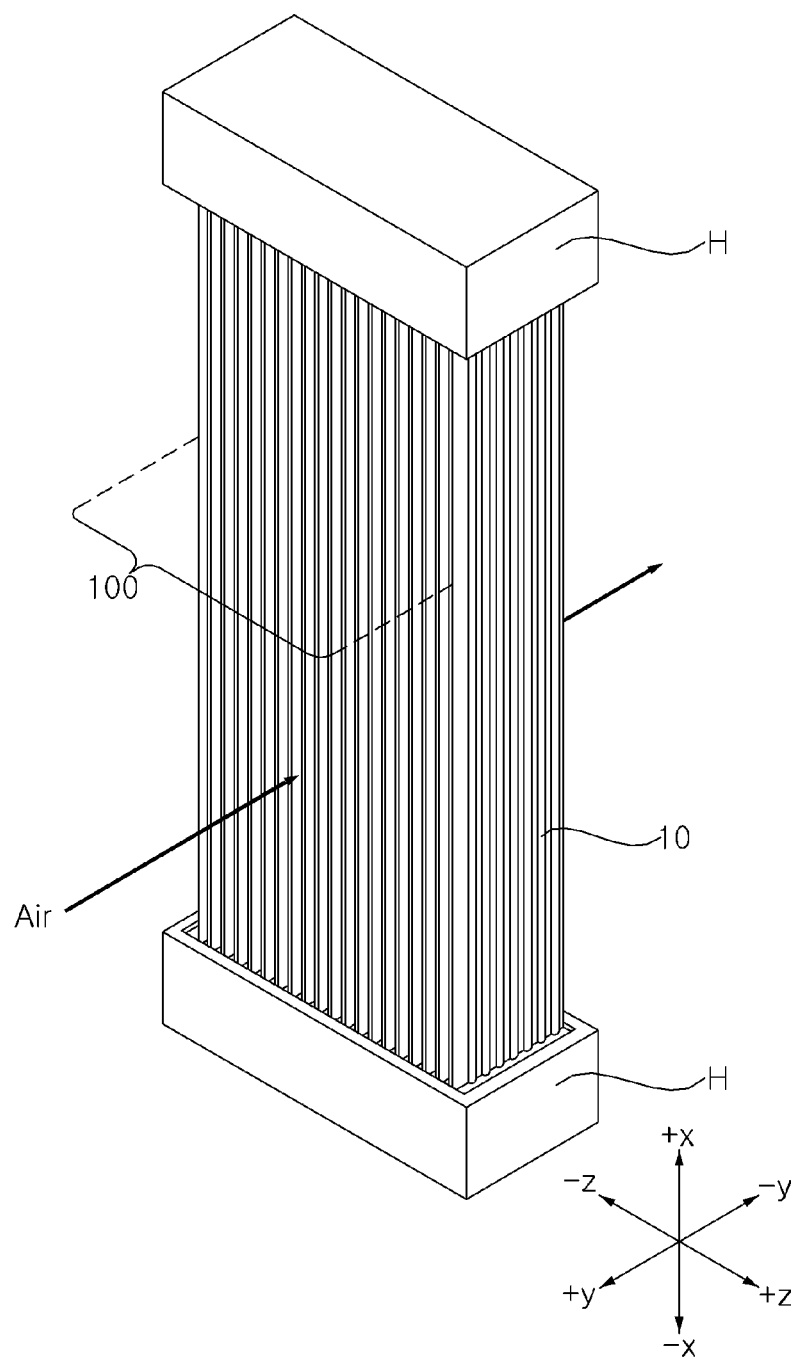

[FIG. 2]
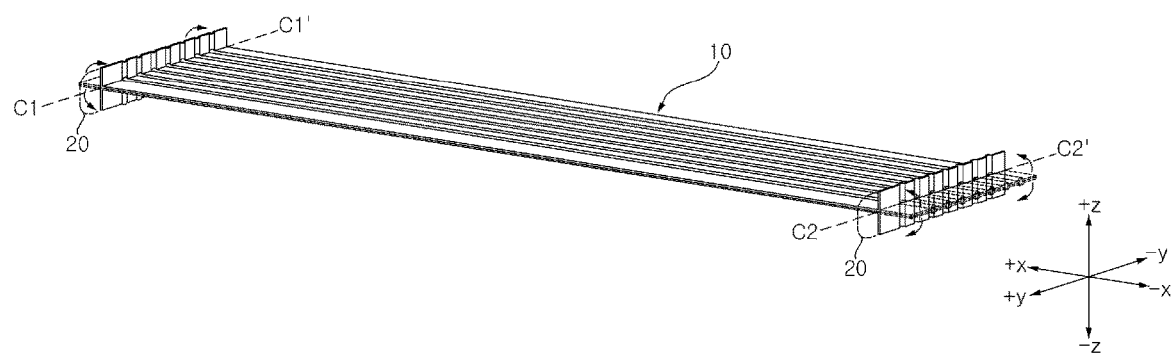

[FIG. 3]
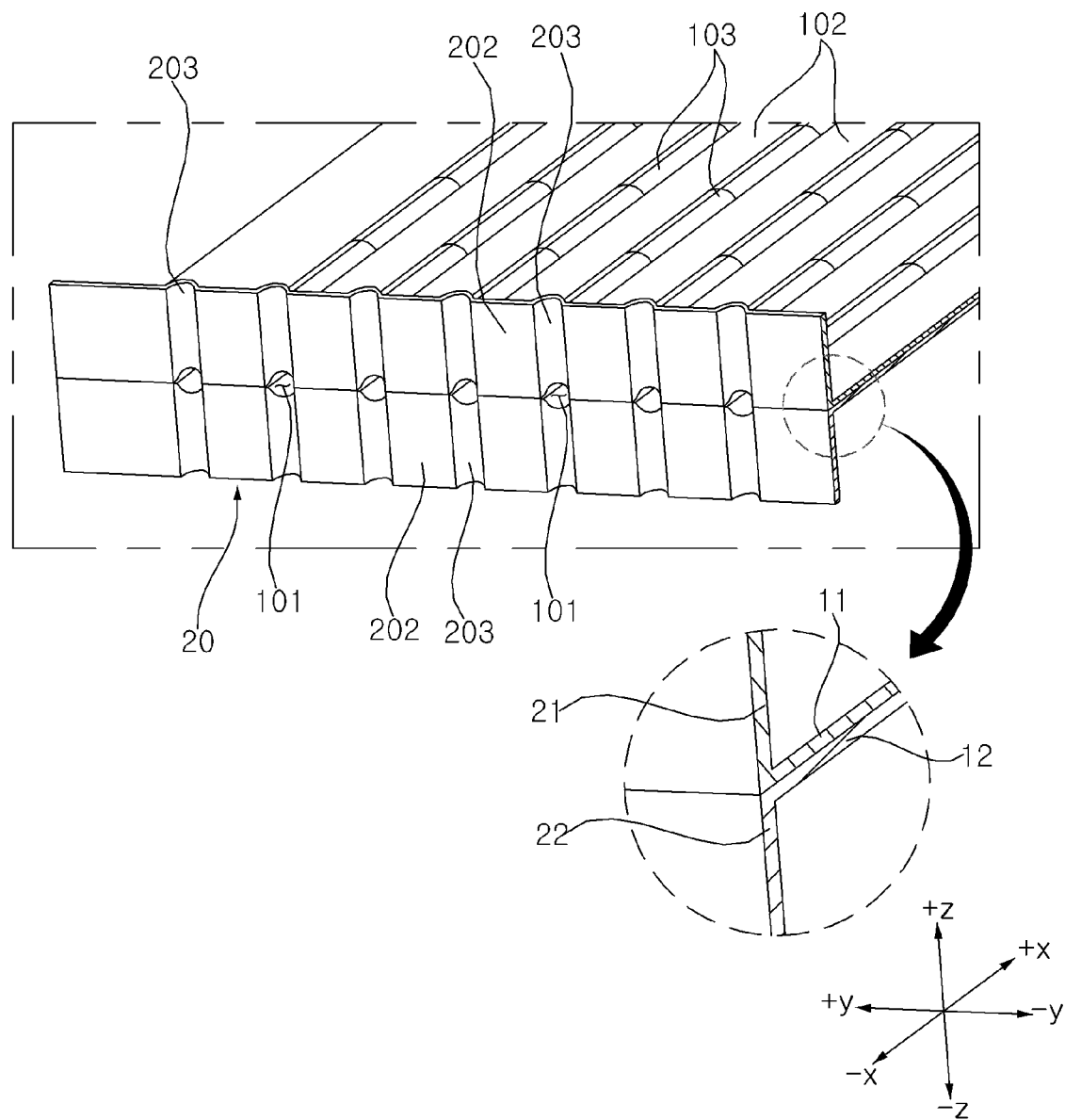

[FIG. 4]
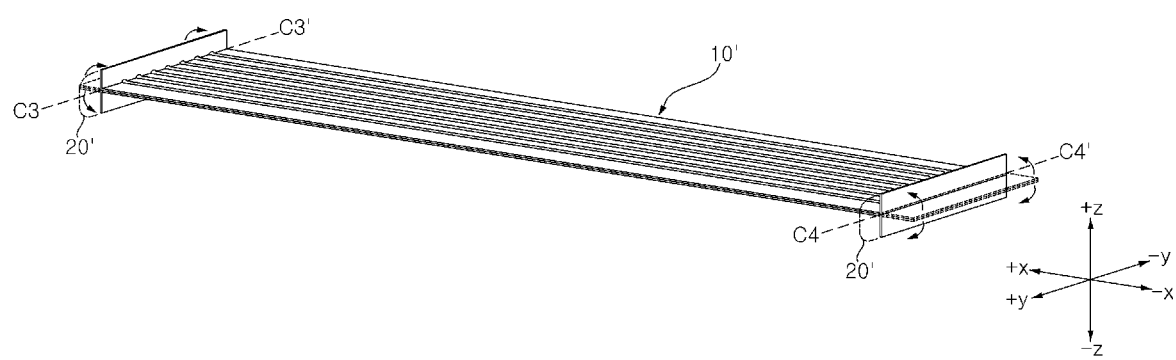

[FIG. 5]
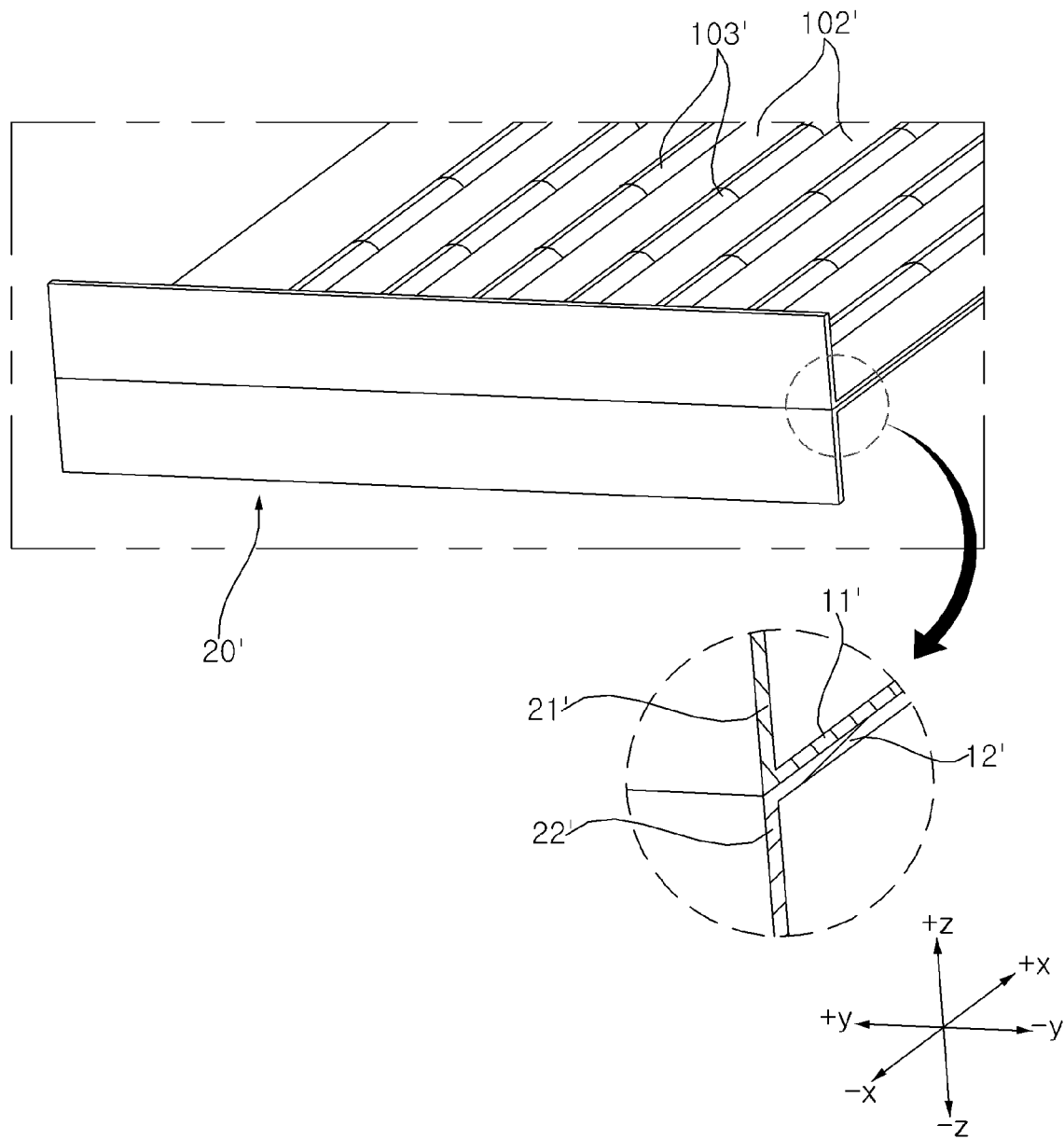

[FIG. 6]
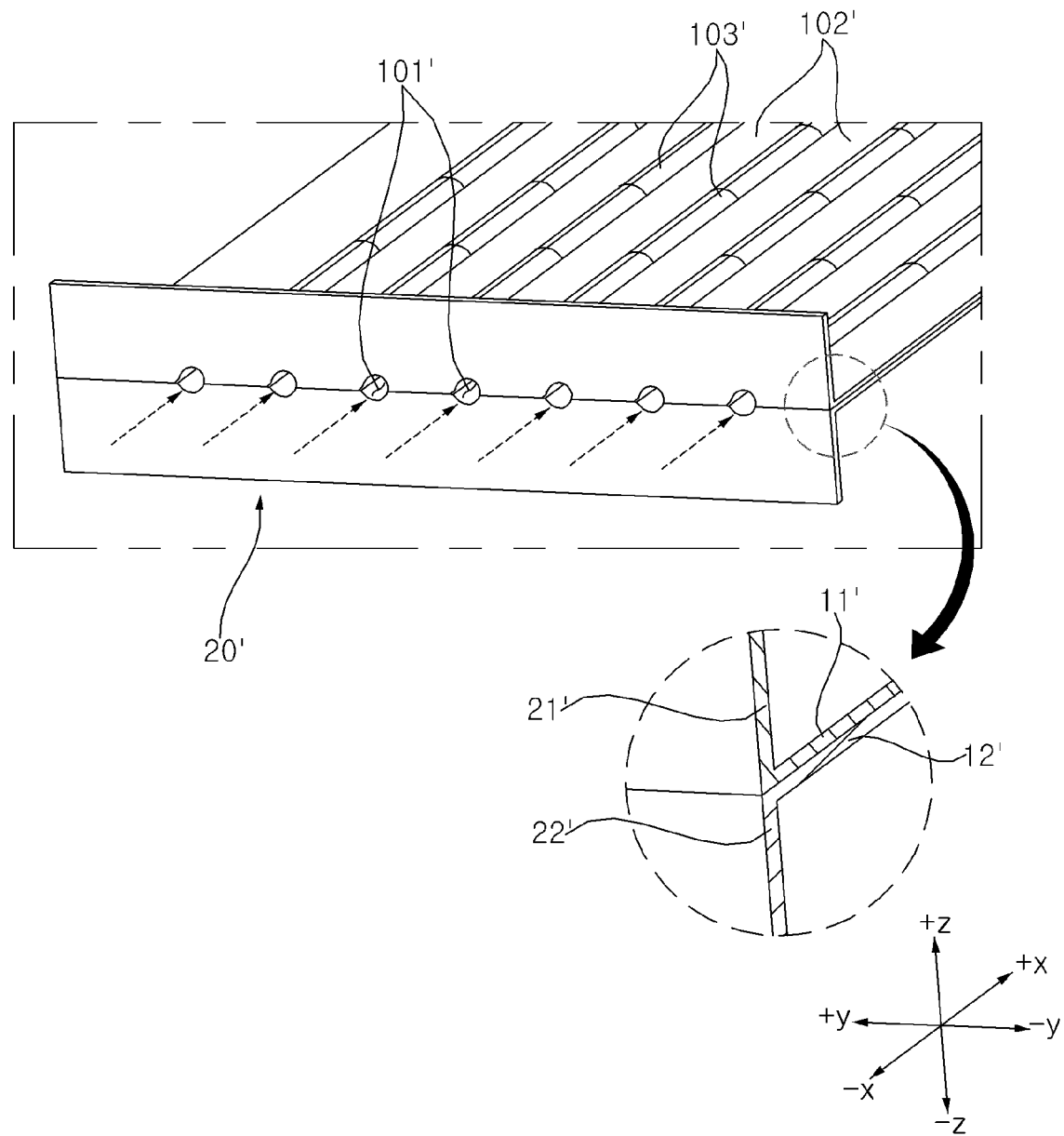

[FIG. 7]
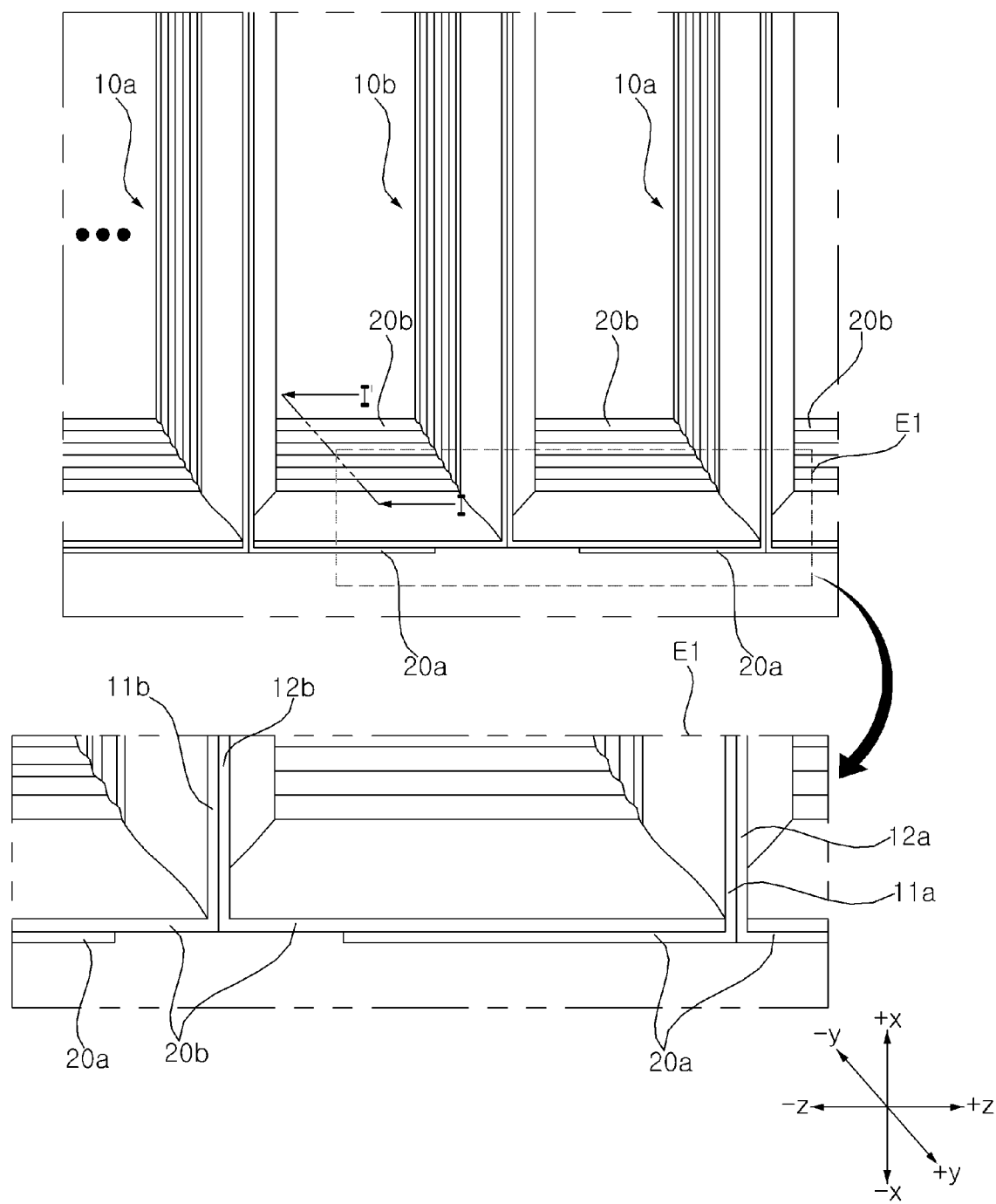

[FIG. 8]
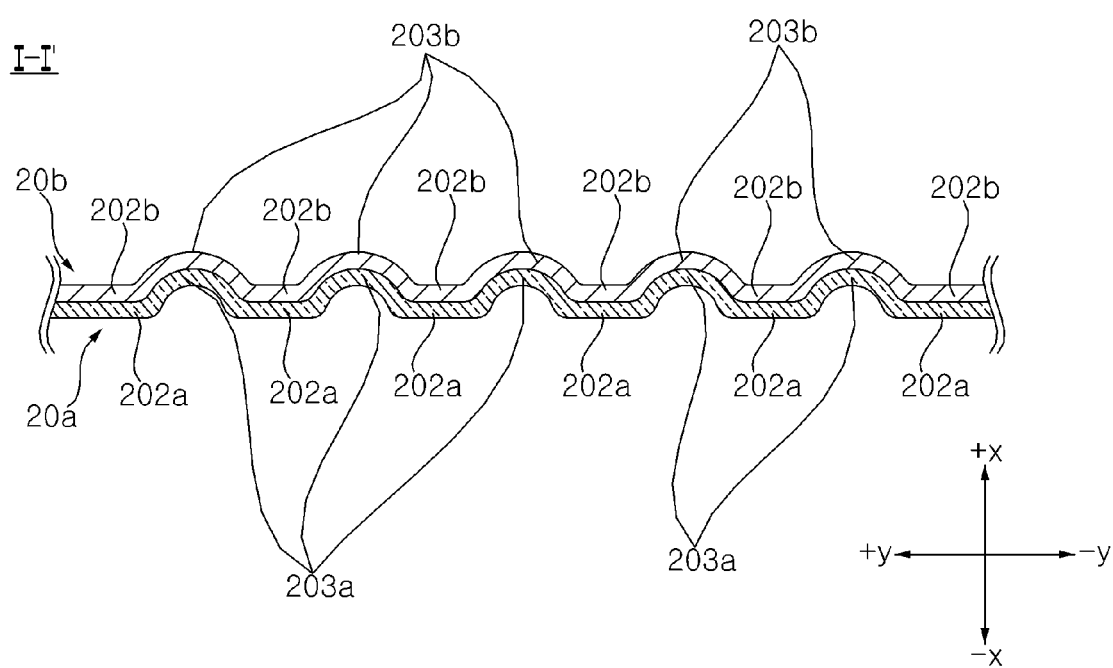

[FIG. 9]
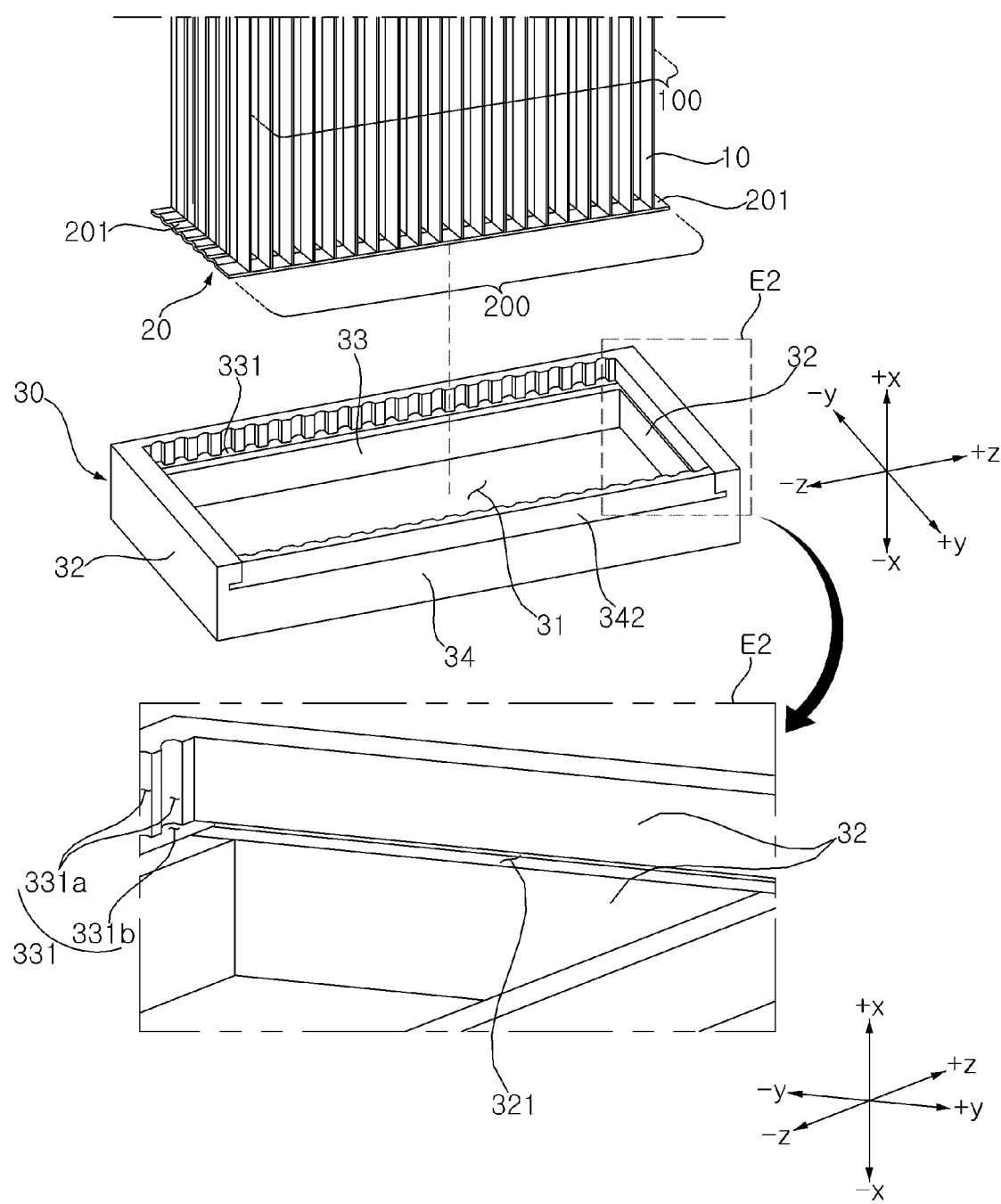

[FIG. 10]
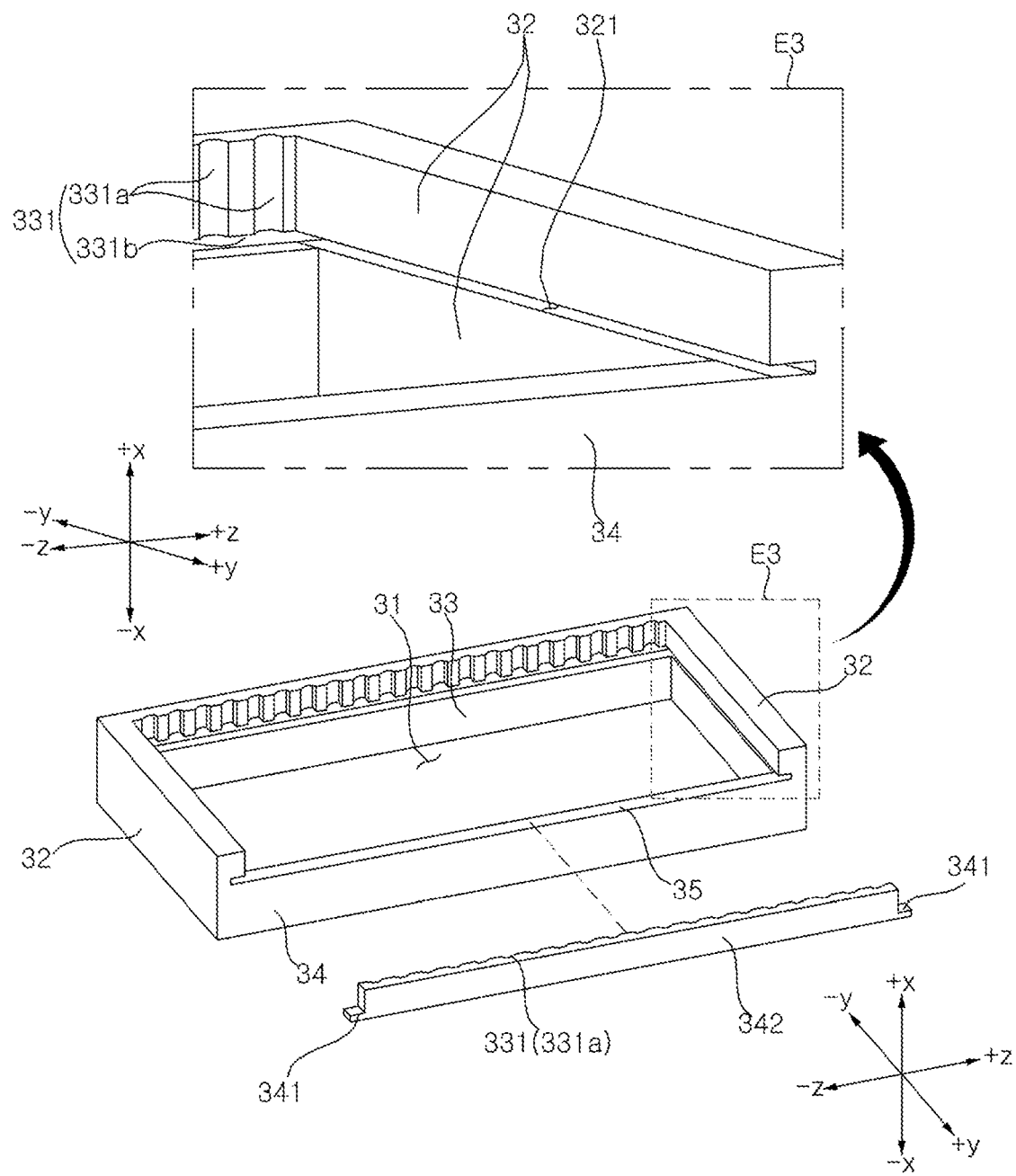

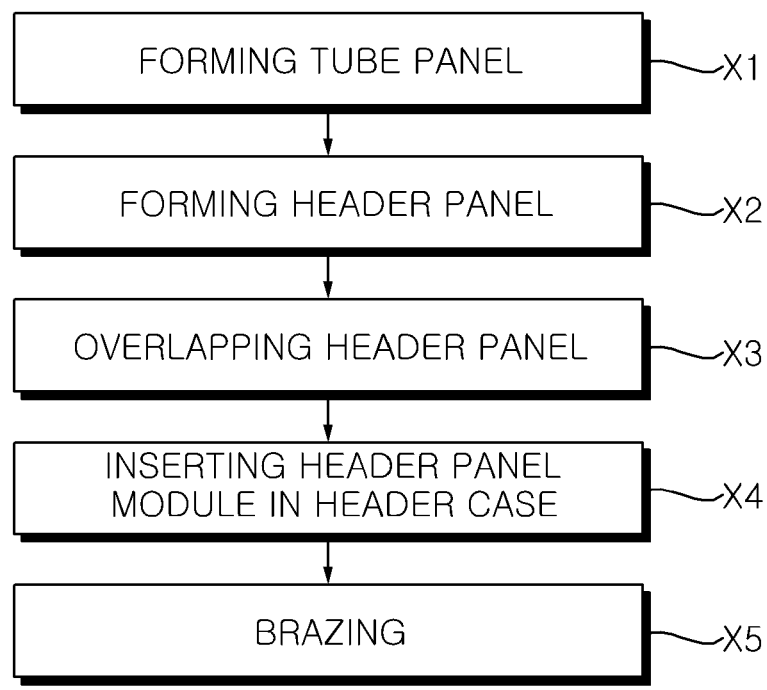
[FIG. 11]

HEAT EXCHANGER AND HEAT EXCHANGER MANUFACTURING METHOD

CROSS-REFERENCE TO RELATED PATENT APPLICATIONS

This application claims priority to Korean Patent Application No. 10-2020-0134404, filed Oct. 16, 2020, whose entire disclosures are hereby incorporated by reference.

BACKGROUND OF THE DISCLOSURE

Field of the Disclosure

The present disclosure relates to a heat exchanger and a method of manufacturing a heat exchanger and, more particularly, to a heat exchanger that is improved in manufacturing speed and manufacturing cost because it has a folding-type header structure, that has fewer brazing apertures in a product, and that can easily cope with the specifications of a product, and a method of manufacturing a heat exchanger.

Related Art

In general, a heat exchanger can be used as a condenser or an evaporator in a refrigerant cycle system composed of a compressor, a condenser, an expansion device, and an evaporator. A heat exchanger can be installed in a vehicle, a refrigerator, an air conditioner, or the like, and can make a refrigerant exchange heat with air.

A heat exchanger can be classified into a fin tube type heat exchanger, a micro channel type heat exchanger, etc. A heat exchanger may include tubes through which a refrigerant flows and a header that is connected to the tubes and distributes a refrigerant to the tubes. In the fin tube type heat exchanger, fins for heat dissipation may be coupled between the tubes.

In the related art, an inlet is formed on a side of a header through slotting or wire cutting and then a tube is inserted into the inlet. For example, a header having a plurality of insertion holes in which ends of tubes are inserted has been disclosed in Korean Patent No. 10-0644135 in the related art.

However, in the related art, there is a problem that poor brazing is frequently generated due to the tolerance between the inlet and the tubes.

Further, in the related art, there is a problem that specific molds for manufacturing heat exchangers are needed in accordance with the sizes of the heat exchangers, so the manufacturing efficiency is deteriorated.

Further, in the related art, there is a problem that since slotting should be performed on one header by the number of tubes, the manufacturing speed is decreased and the efficiency in mass production is deteriorated.

Further, in the related art, there is a problem that since the blade of the machining equipment becomes worn out, it is difficult to form an inlet, in which a tube is inserted, in a predetermined shape and the blade should be frequently replaced.

PRIOR ART DOCUMENT

Patent Document

Korean Patent No. 10-0644135 (publication date, 2006. Nov. 10)

Korean Utility Model Publication No. 20-2007-0017024 (publication date, 2009. Apr. 27)

Korean Utility Model No. 20-0432601 (publication date, 2006. Dec. 5)

Korean Patent No. 10-1447072 (publication date, 2014. Oct. 6)

Korean Patent Application Publication No. 10-2019-0097632 (publication date, 2019. Aug. 21)

SUMMARY OF THE DISCLOSURE

An objective of the present disclosure is to solve the problems described above.

Another objective of the present disclosure is to provide a heat exchanger that can reduce tolerance due to brazing and can improve stability of a product.

Another objective of the present disclosure is to provide a heat exchanger that can be flexibly custom-made in accordance with the size of a product having the heat exchanger without a specific mold.

Another objective of the present disclosure is to provide a heat exchanger that can improve the efficiency in mass production by improving the manufacturing speed and the manufacturing cost.

Another objective of the present disclosure is to insert a tube in a header without separate slotting or wire cutting for forming an inlet.

The objects of the present disclosure are not limited to the objects described above and other objects will be clearly understood by those skilled in the art from the following description.

In order to achieve the objectives, a heat exchanger according to an embodiment of the present disclosure includes: a tube panel module elongated in an up-down direction and including a plurality of first tube panels and second tube panels that are alternately arranged in a left-right direction; header panel modules respectively formed at an upper end and a lower end of the tube panel module and elongated in a left-right direction; and a header case having an open one side, providing a space therein, and covered on the one side by the cover module such that the first tube panels and the second tube panels communicate with the space, in which the first tube panel is formed by bonding a first panel and a second panel, the second tube panel is formed by bonding a third panel and a fourth panel, and the header panel module includes: a first header panel formed by bending both ends of the first panel and the second panel in opposite directions; and a second header panel formed by bending both ends of the third panel and the fourth panel in opposite directions and bonded to the first header panel between every first tube panel and second tube panel.

Accordingly, there is an advantage that it is possible to manufacture a heat exchanger flexibly in correspondence to the size of the heat exchanger by adjusting the number of header panels that are bonded without a specific mold. Further, since there is no need for an inlet for inserting a tube panel, there is an advantage that apertures are reduced in brazing and the manufacturing efficiency is increased.

The first header panel may be disposed perpendicular to the first tube panel, and the second header panel may be disposed perpendicular to the second tube panel.

The first header panel may have first flat portions and first recessions that are alternately formed; the second header panel may have second flat portions and second recessions that are alternately formed; and the first flat portion and the second flat portion may be in contact with each other, and the first recession and the second recession may be in contact with each other at a portion where the first header panel and the second header panel are bonded.

Accordingly, the first header panel and the second header panel can be coupled to each other at accurate positions, so tolerance can be reduced.

The first header panel may be formed by bending both ends of the first panel and the second panel that are flat, and the second header panel may be formed by bending both ends of the third panel and the fourth panel that are flat.

The first tube panel and the second tube panel each may have a channel through which a refrigerant flows, and the channels may be exposed to the outside of the first tube panel and the second tube panel by punching the first header panel and the second header panel.

Accordingly, there is an advantage that it is easy to form the header panel by bending the tube panels and it is possible to reduce the probability of badness such as blocking of a channel at a bending portion in bending.

The first header panel may be formed by inserting a jig between both ends of the first panel and the second panel and then opening the ends to both sides, and the second header panel may be formed by inserting a jig between both ends of the third panel and the fourth panel and then opening the ends to both sides.

The plurality of first header panels may be disposed in the same plane, and the plurality of second header panels may be disposed in the same plane and bonded to tops of the first header panels.

When portions positioned at a left end and a right end of the header panel module and protruding left and right from the tube panel module are defined as insertion panels, the header case may further include first insertion grooves that are recessed on a left side and a right side of the header case to face the space and in which the insertion panels are inserted.

Accordingly, it is possible to form a header by inserting the header panel module in the header case.

The first insertion grooves may be elongated rearward from a front end of the header case and may guide insertion of the insertion panels, a front surface of the header case may be formed lower than a height of the first insertion grooves, and the header panel module may move over a top of the front surface.

Accordingly, it is possible to easily slide the header panel module in the header case.

The header case may include a cap block inserted in the first insertion grooves and being in contact with the header panel module and the front surface of the header case.

A rear surface of the header case and the cap block may include a second insertion groove that is recessed to face the space and in which the header panel module and a portion of the tube panel module are inserted.

The second insertion groove may include: a plurality of tube panel grooves that are elongated in the up-down direction and are arranged in the left-right direction and in which the plurality of tube panels are inserted; and a header panel groove that is elongated in the left-right direction and in which the header panel module is inserted.

Accordingly, it is possible to reduce tolerance at a portion where the header panel module and the tube panel module are in contact with the header case.

In order to achieve the objectives, a heat exchanger according to another embodiment of the present disclosure may include: a tube panel module elongated in an up-down direction and including a plurality of first tube panels and second tube panels that are alternately arranged in a left-right direction; and header panel modules respectively formed at an upper end and a lower end of the tube panel module and elongated in the left-right direction.

The heat exchanger may further include a header case having an open one side, providing a space therein, and covered on the one side by the cover module such that the first tube panels and the second tube panels communicate with the space.

The first tube panel may be formed by bonding a first panel and a second panel.

The second tube panel may be formed by bonding a third panel and a fourth panel.

The header panel module may include: a first header panel formed by bending both ends of the first panel and the second panel in opposite directions; and a second header panel formed by bending both ends of the third panel and the fourth panel in opposite directions.

The second header panel may be bonded to the first header panel between every first tube panel and second tube panel.

The first header panel may be disposed perpendicular to the first tube panel.

The second header panel may be disposed perpendicular to the second tube panel.

The first header panel may have first flat portions and first recessions that are alternately formed.

The second header panel may have second flat portions and second recessions that are alternately formed.

The first flat portion and the second flat portion may be in contact with each other.

The first recession and the second recession may be in contact with each other.

The first flat portion and the second flat portion may be in contact with each other at a portion where the first header panel and the second header panel are bonded.

The first recession and the second recession may be in contact with each other at a portion where the first header panel and the second header panel are bonded.

The first header panel may be formed by bending both ends of the first panel and the second panel that are flat.

The second header panel may be formed by bending both ends of the third panel and the fourth panel that are flat.

The first tube panel and the second tube panel each may have a channel through which a refrigerant flows.

The channels may be exposed to the outside of the first tube panel and the second tube panel by punching the first header panel and the second header panel.

The first header panel may be formed by inserting a jig between both ends of the first panel and the second panel and then opening the ends to both sides.

The second header panel may be formed by inserting a jig between both ends of the third panel and the fourth panel and then opening the ends to both sides.

The plurality of first header panels may be disposed in the same plane.

The plurality of second header panels may be disposed in the same plane.

The plurality of second header panels may be bonded to tops of the first header panels.

Insertion panels may be defined as portions positioned at a left end and a right end of the header panel module and protruding left and right from the tube panel module.

The header case may further include first insertion grooves in which the insertion panels are inserted.

The first insertion grooves may be recessed on a left side and a right side of the header case to face the space.

The first insertion grooves may be elongated rearward from a front end of the header case.

The first insertion grooves may guide insertion of the insertion panels.

A front surface of the header case may be formed lower than a height of the first insertion grooves.

The header panel module may move over a top of the front surface of the header case.

The header case may include a cap block inserted in the first insertion grooves.

The cap block may be in contact with the header panel module and the front surface of the header case.

A rear surface of the header case and the cap block may include a second insertion groove that is recessed to face the space.

The header panel module may be inserted in the second insertion groove.

A portion of the tube panel module may be inserted in the second insertion groove.

The second insertion groove may include a plurality of tube panel grooves that are elongated in the up-down direction and are arranged in the left-right direction.

The plurality of tube panels may be inserted in the plurality of tube panel grooves.

The second insertion groove may include a header panel groove that is elongated in the left-right direction.

The header panel module may be inserted in the header panel groove.

In order to achieve the objectives, a heat exchanger according to another embodiment of the present disclosure includes: a tube panel module elongated in an up-down direction and including a plurality of first tube panels and second tube panels that are alternately arranged in a left-right direction; header panel modules respectively formed at an upper end and a lower end of the tube panel module and elongated in the left-right direction; and a header case having an open one side, providing a space therein, and covered on the one side by the cover module such that the first tube panels and the second tube panels communicate with the space, in which the first tube panel is formed by bonding a first panel and a second panel, the second tube panel is formed by bonding a third panel and a fourth panel, and the header panel module includes: a first header panel formed by bending both ends of the first panel and the second panel in opposite directions; and a second header panel formed by bending both ends of the third panel and the fourth panel in opposite direction and bonded to the first header panel between every first tube panel and second tube panel, the first header panel has first flat portions and first recessions that are alternately formed, the second header panel has second flat portions and second recessions that are alternately formed, and the first flat portion and the second flat portion are in contact with each other, and the first recession and the second recession are in contact with each other at a portion where the first header panel and the second header panel are bonded.

In order to achieve the objectives, a heat exchanger according to another embodiment of the present disclosure includes: a tube panel module elongated in an up-down direction and including a plurality of first tube panels and second tube panels that are alternately arranged in a left-right direction; header panel modules respectively formed at an upper end and a lower end of the tube panel module and elongated in the left-right direction; and a header case having an open one side, providing a space therein, and covered on the one side by the cover module such that the first tube panels and the second tube panels communicate with the space, in which the first tube panel is formed by bonding a first panel and a second panel that are flat, the second tube panel is formed by bonding a third panel and a fourth panel that are flat, and the header panel module includes: a first header panel formed by bending both ends of the first panel and the second panel in opposite directions; and a second header panel formed by bending both ends of the third panel and the fourth panel in opposite direction and bonded to the first header panel between every first tube panel and second tube panel.

In order to achieve the objectives, a heat exchanger according to an embodiment of the present disclosure includes: a tube panel module elongated in an up-down direction and including a plurality of first tube panels and second tube panels that are alternately arranged in a left-right direction; header panel modules respectively formed at an upper end and a lower end of the tube panel module and elongated in the left-right direction; and a header case having an open one side, providing a space therein, and covered on the one side by the cover module such that the first tube panels and the second tube panels communicate with the space, in which the first tube panel is formed by bonding a first panel and a second panel, the second tube panel is formed by bonding a third panel and a fourth panel, and the header panel module includes: a first header panel formed by bending both ends of the first panel and the second panel in opposite directions; a second header panel formed by bending both ends of the third panel and the fourth panel in opposite directions and bonded to the first header panel between every first tube panel and second tube panel; and insertion panels defined as portions positioned at a left end and a right end of the header panel module and protruding left and right from the tube panel module, and the header case further includes first insertion grooves that are recessed on a left side and a right side of the header case to face the space and in which the insertion panels are inserted.

In order to achieve the objectives, a method of manufacturing a heat exchanger according to an embodiment of the present disclosure includes: forming a plurality of tube panels by bonding a pair of panels; forming a plurality of header panels by bending ends of the plurality of tube panels; forming a header panel module by overlapping the plurality of header panels; inserting the header panel module in an open one side of a header case; and brazing contact portions between the plurality of header panels and the header case.

Accordingly, there is an advantage that it is possible to manufacture a heat exchanger flexibly in correspondence to the size of the heat exchanger by adjusting the number of header panels that are bonded without a specific mold. Further, since there is no need for an inlet for inserting a tube panel, there is an advantage that apertures are reduced in brazing and the manufacturing efficiency is increased.

The forming of a plurality of header panels may bend ends of the pair of panels in opposite directions.

In order to achieve the objectives, the method of manufacturing a heat exchanger according to an embodiment of the present disclosure, and details of other embodiments are included in the detailed description and the drawings.

According to the heat exchanger and the method of manufacturing a heat exchanger of the present disclosure, one or more of the following effects can be achieved.

First, since there is provided a folding-type bonding portion header structure in which both ends of the tube panel are bent and then the bent portions are bonded to each other, there is no need for a specific inlet for inserting the tube panel, so there is an advantage that tolerance due to brazing decreases and the stability of a product can be increased.

Second, there is an advantage that it is possible to manufacture a heat exchanger flexibly in a custom-made type in correspondence to the size of a product having the heat exchanger without a specific mold.

Third, there is an advantage that the manufacturing speed and manufacturing cost are improved, whereby it is possible to increase the efficiency of mass production.

Fourth, there is an advantage that it is possible to couple the tube panel to the header without separate slotting or wire cutting.

The effects of the present disclosure are not limited to those described above and other effects not stated herein may be made apparent to those skilled in the art from claims.

BRIEF DESCRIPTION OF THE DRAWINGS

FIG. 1 is a view of a heat exchanger according to an embodiment of the present disclosure.

FIG. 2 is a view showing a tube panel and a header panel according to an embodiment of the present disclosure.

FIG. 3 is an enlarged view of the tube panel and the header panel of FIG. 2.

FIG. 4 is a view showing a tube panel and a header panel according to another embodiment of the present disclosure.

FIG. 5 is an enlarged view of the tube panel and the header panel of FIG. 4.

FIG. 6 is a view showing the state in which channels are exposed to the outside by punching the header panel of FIG. 5.

FIG. 7 is a view showing a tube panel and a header panel according to an embodiment of the present disclosure.

FIG. 8 is a view showing a cross-section of the header panel taken along line I-I' of FIG. 7.

FIG. 9 is a view showing a structure in which a header panel module is inserted in a header case.

FIG. 10 is a view showing a structure in which a cap block is inserted in a header case.

FIG. 11 is a block diagram showing a method of manufacturing a heat exchanger according to an embodiment of the present disclosure.

DESCRIPTION OF EXEMPLARY EMBODIMENTS

The advantages and features of the present disclosure, and methods of achieving them will be clear by referring to the exemplary embodiments that will be described hereafter in detail with reference to the accompanying drawings. However, the present disclosure is not limited to the exemplary embodiments described hereafter and may be implemented in various ways, and the exemplary embodiments are provided to complete the description of the present disclosure and let those skilled in the art completely know the scope of the present disclosure and the present disclosure is defined by claims. Like reference numerals indicate like components throughout the specification.

Spatial relative terms "below", "beneath", "lower", "above", "upper", etc. may be used to easily describe the correlation of one component and another component, as shown in the drawings. The spatially relative terms should be construed as terminologies including different directions of components in using or in operating in addition to the directions shown in drawings. For example, when components shown in the drawings are turned upside down, a component described as being "below" or "beneath" another component may be positioned "over" the another component. Accordingly, "below" and "beneath" that are exemplary terms may include both of up and down directions. A component may be oriented in different directions, so the spatially relative terms may be construed in accordance with orientation.

The terms used herein are provided to describe embodiments without limiting the present disclosure. In the specification, a singular form includes a plural form unless specifically stated in the sentences. The terms "comprise" and/or "comprising" used herein do not exclude that another component, step, and/or operation exist or are added in the stated component, step, and/or operation.

Unless defined otherwise, all terms (including technological and scientific terminologies) used herein may be used as meanings that those skilled in the art can commonly understand. Terms defined in common dictionaries are not construed ideally or excessively unless specifically clearly defined.

The thickness or size of components is exaggerated, omitted, or schematically shown in the drawings for convenience and clarity of description. The size or area of components does not generally reflect the actual size or area.

Hereinafter, the present disclosure will be described with reference to the drawings illustrating a heat exchanger according to exemplary embodiments of the present disclosure.

Hereafter, directions are defined for a heat exchanger according to an embodiment of the present disclosure and components thereof on the basis of the coordinate system shown in FIGS. 1 to 11.

The directions in which the x-axis extends may be defined as up and down directions. The direction in which the +x-axis extends from the origin may be the up direction and the direction in which the −x-axis extends from the origin may be the down direction. The directions in which the y-axis extends may be defined as front and rear directions. The direction in which the +y-axis extends from the origin may be the front direction and the direction in which the −y-axis extends from the origin may be the rear direction. The directions in which the z-axis extends may be defined as left and right directions. The direction in which the +z-axis extends may be the right direction and the direction in which the −z-axis extends may be the left direction.

Referring to FIG. 1, a heat exchanger according to the present disclosure may include a tube panel 10. The tube panel 10 may be elongated in one direction. The tube panel 10 may have a plurality of channels 101 therein through which a refrigerant passes (see FIG. 3).

The heat exchanger according to the present disclosure includes a header H. The header H may be provided in a pair and may be coupled to both ends of the tube panel 10. The header H may be elongated to a side. A plurality of tube panels 10 may be spaced apart from each other and arranged in the longitudinal direction of the header H. The header H may be formed by combining a header case 30 and a header panel module 200 (see FIG. 9).

A refrigerant can flow into any one of the pair of headers H. The refrigerant flowing inside can pass through the channels 101 of the tube panel 10. The refrigerant that has passed through the channels 101 can flow into the other one of the pair of headers H and then can be discharged out of the heat exchanger. Air can exchange heat with the refrigerant while passing through between a plurality of tube panels 10.

Referring to FIGS. 2 and 3, according to an embodiment of the present disclosure, the tube panel 10 may be elongated in the up-down direction. Header panels 10 may be formed in a pair at the upper end and lower end of the tube panel 10, respectively. The header panels 20 may be elongated in the left-right direction. The header panels 20 may be disposed perpendicular to the tube panel 10.

The tube panel 10 may be formed by bonding a first panel 11 and a second panel 12 to each other. The first panel 11 may be composed of a plurality of flat portions and a plurality of recessions that is convex on a side. The second panel 12, similar to the first panel, may be composed of a plurality of flat portions and a plurality of recessions that is convex on another side. The flat portions and the recessions may be elongated in the up-down direction.

The first panel 11 and the second panel 12 may have the same shape. The first panel 11 and the second panel 12 may have the same shape and may be turned over 180 degrees and bonded to each other.

A plurality of fins 102 and tubes 103 may be formed by bonding the first panel 11 and the second panel 12 to each other. The fins 102 may be formed by bonding the flat portions of the first panel 11 and the flat portions of the second panel 12. The plurality of tubes may be formed by disposing the recessions of the first panel 11 and the recessions of the second panel 12 to be convex in opposite directions. Channels 101 may be formed in the tubes 103.

The header panels 20 may be formed by bending both ends of the tube panel 10. The header panels 20 may be formed by bending both ends of the first panel 11 and the second panel 12 in opposite directions. The first panel 11 and the second panel 12 may be bent perpendicular to the tube panel 10. The header panels 20 each may be divided into a header panel portion 21 formed by bending an end of the first panel 11 and a header panel portion 22 formed by bending an end of the second panel 12.

The first panel 11 and the second panel 12 may be made of metal such as stainless steel, copper, and aluminum. The header panel 20 may be formed by inserting a jig between both ends of the first panel 11 and the second panel 12 and then opening the ends to both sides. The properties of the first panel 11 and the second panel 12 may be adjusted through heat treatment before the first panel 11 and the second panel 12 are opened by a jig.

When the header panels 20 are formed, the channels 101 of the tube panel 10 are formed through the header panels 20 and may be exposed to the outside of the tube panel 10.

The header panels 20 are formed by bending both ends of the first panel 11 and the second panel 12, whereby they may have a plurality of flat portions 202 and recessions 203 alternately arranged.

A tube panel 10' according to another embodiment of the present disclosure is described hereafter with reference to FIGS. 4 to 6 mainly about differences from the tube panel 10 according to an embodiment of the present disclosure described with reference to FIGS. 2 and 3, and the same configuration is not described.

Both ends of the tube panel 10' according to an embodiment of the present disclosure may be formed flat. Both ends of the tube panel 10' may be formed by flattening after heat treatment. Both ends of the tube panel 10' may be formed by bonding a first panel 11' and a second panel 12' of which both ends are flat.

Header panels 20' may be formed by bending both ends of the tube panel 10'. The header panels 20' may be formed by bending both ends of the first panel 11' and the second panel 12' in opposite directions. The first panel 11' and the second panel 12' may be bent perpendicular to the tube panel 10'.

The first panel 11' and the second panel 12' may be made of metal such as stainless steel, copper, and aluminum. The header panel 20' may be formed by inserting a jig between both ends of the first panel 11' and the second panel 12' and then opening the ends to both sides. The properties of the first panel 11' and the second panel 12' may be adjusted through heat treatment before the first panel 11' and the second panel 12' are opened by a jig.

The header panels 20' may be formed flat. When the header panels 20' are formed by bending the first panel 11' and the second panel 12', channels 101' formed at the tube panel 10 may not be exposed to the outside by the header panels 20' (see FIG. 5). The channels 101' may be exposed to the outside of the tube panel 10' by punching the header panel 20' (see FIG. 6).

Referring to FIG. 7, the tube panel 10 may be divided into a first tube panel 10a and a second tube panel 10b that are elongated in the up-down direction. The first tube panel 10a and the second tube panel 10b each may be provided as one or more pieces. The first tube panel 10a and the second tube panel 10b may be alternately arranged. The first tube panel 10a and the second tube panel 10b may be disposed in parallel with each other. The first tube panel 10a and/or the second tube panel 10b may be the same as the tube panels 10 and 10' described above. The first tube panel 10a and the second tube panel 10b may have the same shape.

The first tube panel 10a may be formed by bonding a first panel 11a and a second panel 12a. The second tube panel 10b may be formed by bonding a third panel 11b and a fourth panel 12b. The first panel 11a and the second panel 12a are the same as the first panel 11 and the second panel 12 described above, so they are not described. The third panel 11b and the fourth panel 12b are the same as the first panel 11 and the second panel 12 described above, so they are not described.

The header panels 20 may be divided into first header panels 20a formed at both ends of the first tube panel 10a and second header panels 20b formed at both ends of the second tube panel 10b. The first header panels 20a may be formed by bending both ends of the first panel 11a and the second panel 12a in opposite directions. The second header panel 20b may be formed by bending both ends of the third panel 11b and the fourth panel 12b in opposite directions. The first header panel 20a and the second header panel 20b may have the same shape.

The first header panel 20a and the second header panel 20b may be overlapped and bonded to each other. The first header panel 20a and the second header panel 20b may be overlapped and bonded between every first tube panel 10a and second tube panel 10.

A plurality of first tube panels 10a may be spaced apart from each other in parallel with each other. A plurality of first header panels 20a formed at the plurality of first tube panels 10a may be disposed in the same plane. The plurality of first header panels 20a may be spaced apart from each other.

A plurality of first tube panels 10a may be spaced apart from each other in parallel with each other. A plurality of second header panels 20b may be disposed in the same plane. The plurality of second header panels 20b may be spaced apart from each other. The first header panels 20a and the second header panels 20b may be formed in parallel with each other.

The first tube panel 10a and the second tube panel 10b may be alternately arranged and may be disposed in parallel to face each other. The second header panel 20b may be bonded to the top of the first header panel 20a. The first header panel 20a and the second header panel 20b may be alternately disposed and may overlap each other between the first tube panel 10a and the second tube panel 10.

The first header panel 20*a* may be spaced apart from the channels 101 (FIG. 3) formed in the second tube panel 10*b*. That is, the channels 101 may be exposed to the outside without being covered by the first header panel 201.

The other first header panels 20*a* except for the outermost first header panel 20*a* of the plurality of first header panels 20*a* may be bonded to two second header panels 20*b*. The other second header panels 20*b* except for the outermost second header panel 20*b* of the plurality of second header panels 20*b* may be bonded to two first header panels 20*a*.

Although only the tube panel 10 and the header panel 20 according to an embodiment of the present disclosure were described above, the configuration may also be applied to the tube panel 10' and the header panel 20' according to another embodiment of the present disclosure.

Referring to FIG. 8, the first header panel 20*a* according to an embodiment of the present disclosure may have a plurality of flat portions 202*a* and first recessions 203*a* convexly formed from the first flat portions 202*a*. The first flat portions 202 and the first recessions 203*a* may be alternately arranged. The second header panel 20*b* according to an embodiment of the present disclosure may have a plurality of second flat portions 202*b* and second recessions 203*b* convexly formed from the second flat portions 202*b*. The second flat portions 202*b* and the second recessions 203*b* may be alternately arranged.

The first flat portion 202*a* and the second flat portion 202*b* may be bonded to each other at the portion where the first header panel 20*a* and the second header panel 20*b* are bonded. The first recession 203*a* and the second recession 230*b* may be in contact with each other at the portion where the first header panel 20*a* and the second header panel 20*b* are bonded.

The second flat portion 202*b* may be bonded to the top of the first flat portion 202*a*. The second recession 203*b* may be bonded to the top of the first recession 203*a*. The first recession 203*a* may be inserted under the second recession 203*b*.

Referring to FIG. 9, a header case 30 may be open on a one side and may provide a space 31 therein. The header case 30 may be closed on another side. The front-rear direction and left-right direction of the space 31 may be surrounded by the front surface 34, the rear surface 33, and both sides 32 of the header case 30. The both sides 32 may be a left side formed at the left of the header case 30 and a right side formed at the right of the header case 30.

A refrigerant may flow into the header case 30 or may be discharged from the header case 30. The heat exchanger may include a pair of header cases 30. A refrigerant flowing in any one of the pair of header cases 30 may be discharged outside through the other one of the pair of header cases 30.

A tube panel module 100 may be composed of a plurality of tube panels 10 disposed in parallel. The tube panel module 100 may include a plurality of first tube panels 10*a* and second tube panels 10*b*.

A header panel module 200 may be formed at the upper end and the lower end of the tube panel module 100. The header panel module 200 may be elongated in the left-right direction. The header panel module 200 may be disposed perpendicular to the tube panel module 100.

The header panel module 200 may be composed of a plurality of header panels 20 overlapping each other. The header panel module 200 may include a first header panel 20*a* and a second header panel 20*b*.

The header panel module 200 is inserted in one side of the header case 200, thereby being able to cover the open one side of the header case 30. When the header panel module 200 covers the one side of the header case 200, the channels 101 formed in the tube panels 10 can communicate with the space 31 of the header case 30.

The portions positioned at the left end and the right end of the header panel module 200 and protruding left and right from the tube panel module 100 may be defined as insertion panels 201. The insertion panels 201, which are a part of the header panel 20, may be portions that do not overlapping other header panel 20.

A first insertion groove 321 may be formed on both sides 32 of the header case 30. That is, the first insertion groove 321 may be formed on the left side 32 and the right side 32 of the header case 30. The first insertion grooves 32 may be recessed on both sides 32 of the header case 30 to face the space 31 of the header case 30. The first insertion grooves 32 may have a shape elongated in the front-rear direction.

The insertion panels 201 may be inserted and coupled in the first insertion grooves 321. When the insertion panels 201 are inserted in the first insertion grooves 321, the header panel module 200 can cover the open one side of the case 30.

Referring to FIG. 10, the first insertion grooves 321 may be elongated rearward from the front end of the header case 30. The first insertion grooves 321 can guide insertion of the insertion panels 201. The insertion panels 201 can be inserted into the front ends of the first insertion grooves 321 and then guided rearward along the first insertion grooves 321.

The front surface 34 of the header case 30 may be formed lower than the height of the first insertion grooves 321. Accordingly, when the insertion panels 201 are inserted into the front ends of the first insertion grooves 321 and then guided rearward, the header panel module 200 can move over the top of the front surface 34.

The header case 30 may include a cap block 342 disposed on the front surface 34 of the header case. The cap block 342 may face the space 31 of the header case 30. The cap block 342 may be positioned in the same plane as the front surface 34 of the header case 30. The cap block 342 can cover the front of the header case 30 in cooperation with the front surface 34.

The cap block 342 may be inserted in the front ends of the first insertion grooves 321. After the insertion panels 201 are inserted in the first insertion grooves 321, the cap block 342 may be inserted into the front ends of the first insertion grooves 321. The cap block 342 may come in contact with the header module panel 200 inserted in the first insertion grooves 321 and the front surface 34 of the header case.

The cap block 342 may have protrusions 341 having a shape corresponding to the first insertion groove 321. The protrusions 341 may be formed in a pair at both sides of the cap block 342 and inserted in the first insertion grooves 321.

Referring to FIGS. 9 and 10, a second insertion groove 331 may be formed on the rear surface 33 of the header case 30. The second insertion groove 331 may be recessed on the rear surface 33 of the header case 30 to face the space 31. The header panel module 200 may be inserted in the second insertion groove 331. A portion of the tube panel module 100 that is adjacent to the header panel module 200 may be inserted in the second insertion groove 331.

The second insertion groove 331 may include a plurality of tube panel grooves 331*a* and header panel grooves 331*b*. The tube panel grooves 331*a* may have a shape corresponding to the tube panel 10. The tube panel grooves 331*a* may be elongated in the up-down direction. The tube panel grooves 331*a* may be formed in the same number as the tube panels 10 and may be arranged in the left-right direction.

The plurality of tube panels 10 may be inserted in the plurality of tube panel grooves 331a.

The header panel grooves 331b may have a shape corresponding to the header panel module 200. The header panel grooves 331b may be elongated in the left-right direction. The header panel module 200 may be inserted in the header panel grooves 331b. The plurality of tube panel grooves 331a and header panel grooves 331b may be continuously formed.

The second insertion groove 331 may be formed in a pair on the rear and front of the header case 30. For example, the second insertion groove 331 may be formed on the front surface 34 of the header case 30. The second insertion groove 331 may be recessed on the inner side of the front surface 34 to face the space 31. Alternatively, the second insertion groove 331 may be formed at the cap block 342. The second insertion groove 331 may be recessed on the cap block 342 to face the space 31.

Referring to FIG. 11, a method of manufacturing a heat exchanger according to an embodiment of the present disclosure may include a step X1 of forming a tube panel 10. In the step X1, the tube panel 10 may be formed by bonding a pair of panels.

For example, as described above, the first tube panel 10a may be formed by bonding a first panel 11a and a second panel 12a. The second tube panel 10b may be formed by bonding a third panel 11b and the second panel 12b.

The method of manufacturing a heat exchanger may include a step X2 of forming a header panel 20. In the step X2, the header panel 20 may be formed by bending both ends of the tube panel 10.

For example, the first header panel 20a may be formed by bending both ends of the first panel 11a and the second panel 12a of the first tube panel 10a in opposite directions. The second header panel 20b may be formed by bending both ends of the third panel 11b and the fourth panel 12b of the second tube panel 10b in opposite directions.

The first header panel 20a may be formed by inserting a jig between both ends of the first panel 11a and the second panel 12a and then opening the ends to both sides. The second header panel 20b may be formed by inserting a jig between both ends of the third panel 11b and the fourth panel 12b and then opening the ends to both sides. Properties of both ends of the panels may be adjusted through heat treatment before the panels are opened by a jig.

The step X2 may further include a step of making both ends of the tube panel 10 flat through flattening after heat treatment. In this case, a step of exposing channels 101 to the outside of the tube panel 10 by punching the header panel 20 at positions corresponding to the channels 101 after forming the header panel 20 may be further included.

The method of manufacturing a heat exchanger may include a step X3 of overlapping a plurality of header panels 20.

In the step X3, the plurality of tube panels 10 may be arranged, and a plurality of first tube panels 10a and a plurality of second tube panels 10b may be arranged in parallel to face each other. The plurality of first tube panels 10a and the plurality of second tube panels 10b may be alternately arranged.

The second header panel 20b may be brought in contact with the first header panel 20b. The second header panel 20b and the first header panel 20a may be in contact with each other between the first and second tube panels 10 and 10b. The second header panel 20b may be disposed on the first header panel 20a.

A component formed by combining the plurality of tube panels 10 may be referred to as a tube panel module 100. A component formed by combining the plurality of overlapping header panels 20 may be referred to as a header panel module 200.

The method of manufacturing a heat exchanger may include a step X4 of inserting the header panel module 200 in a header case 30. The header panel module 200 can cover an open one side of the header case 30 by being inserted in the header case 30. This was described above, so it is not described here.

The method of manufacturing a heat exchanger may include a brazing step X5. In the step X5, the contact portions between the plurality of header panels 20 and the header case 30 may be brazed.

In a step before the brazing step X5, a filter material may be applied to all of the portions where the components of the heat exchanger are in contact with each other. In the step X5, it is possible to bond the components in a brazing type by selectively melting only the filler material by applying high-temperature heat to the heat exchanger and then cooling it. The heat exchanger may be put and brazed in a high-temperature furnace.

The steps X1 to X5 may be sequentially performed.

Although exemplary embodiments of the present disclosure were illustrated and described above, the present disclosure is not limited to the specific exemplary embodiments and may be modified in various ways by those skilled in the art without departing from the scope of the present disclosure described in claims, and the modified examples should not be construed independently from the spirit of the scope of the present disclosure.

What is claimed is:

1. A heat exchanger, comprising:
a tube panel module elongated in a vertical direction and including a plurality of first tube panels and a plurality of second tube panels that are alternately arranged in a lateral direction;
header panel modules respectively formed at an upper end and a lower end of the tube panel module and elongated in the lateral direction; and
a header case having an open one side, providing a space therein, and covered on the one side by one of the header panel modules such that the plurality of first tube panels and the plurality of second tube panels communicate with the space, wherein each first tube panel is formed by bonding a first panel and a second panel, each second tube panel is formed by bonding a third panel and a fourth panel, and each header panel module includes:
a first header panel formed by bending both ends of the first panel and the second panel in opposite directions; and
a second header panel formed by bending both ends of the third panel and the fourth panel in opposite directions and bonded to the first header panel between every first tube panel and second tube panel, wherein when portions positioned at a first lateral end and a second lateral end of the header panel module and protruding laterally from the tube panel module are defined as insertion panels, the header case further includes first insertion grooves that are recessed on a first lateral side and a second lateral side of the header case to face the space and in which the insertion panels are inserted.

2. The heat exchanger of claim 1, wherein the first header panel is disposed perpendicular to the first tube panel, and wherein the second header panel is disposed perpendicular to the second tube panel.

3. The heat exchanger of claim 1, wherein the first header panel has first flat portions and first recessions that are alternately formed, wherein the second header panel has second flat portions and second recessions that are alternately formed, and wherein the first flat portions and the second flat portions are in contact with each other, and the first recession recessions and the second recessions are in contact with each other at a portion at which the first header panel and the second header panel are bonded.

4. The heat exchanger of claim 1, wherein the first header panel is formed by bending both ends of the first panel and the second panel that are flat, and wherein the second header panel is formed by bending both ends of the third panel and the fourth panel that are flat.

5. The heat exchanger of claim 4, wherein the first tube panel and the second tube panel each have a channel through which a refrigerant flows, and wherein the channels are exposed to outside of the first tube panel and the second tube panel by punching the first header panel and the second header panel.

6. The heat exchanger of claim 1, wherein the first header panel is formed by inserting a jig between both ends of the first panel and the second panel and then opening the ends to both sides, and wherein the second header panel is formed by inserting a jig between both ends of the third panel and the fourth panel and then opening the ends to both sides.

7. The heat exchanger of claim 1, wherein the plurality of first header panels is disposed in a same plane, and wherein the plurality of second header panels is disposed in a same plane and bonded to tops of the first header panels.

8. The heat exchanger of claim 1, wherein the first insertion grooves are elongated rearward from a front end of the header case and guide insertion of the insertion panels, and wherein a front surface of the header case is formed lower than a height of the first insertion grooves and the header panel module moves over a top of the front surface.

9. The heat exchanger of claim 8, wherein the header case includes a cap block inserted in the first insertion grooves and being in contact with the header panel module and the front surface of the header case.

10. The heat exchanger of claim 9, wherein a rear surface of the header case and the cap block include a second insertion groove that is recessed to face the space and in which the header panel module and a portion of the tube panel module are inserted.

11. The heat exchanger of claim 10, wherein the second insertion groove includes:
  a plurality of tube panel grooves that is elongated in the vertical direction and arranged in the lateral direction and in which the plurality of tube panels is inserted; and
  a header panel groove that is elongated in the lateral direction and in which the header panel module is inserted.

* * * * *